(12) United States Patent
Coleman et al.

(10) Patent No.: US 9,261,366 B2
(45) Date of Patent: *Feb. 16, 2016

(54) AUTOMATIC ORIGIN DETERMINATION FOR FASTER ROUTE REQUEST INITIATION AND RESULTING SYSTEM RESPONSE TIME

(71) Applicant: BlackBerry Limited, Waterloo (CA)

(72) Inventors: Patrick James Coleman, San Ramon, CA (US); Gennady Dagman, San Jose, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,866

(22) Filed: Jun. 2, 2014

(65) Prior Publication Data
US 2014/0278058 A1 Sep. 18, 2014

Related U.S. Application Data

(63) Continuation of application No. 13/962,772, filed on Aug. 8, 2013, now Pat. No. 8,744,762, which is a continuation of application No. 12/962,874, filed on Dec. 8, 2010, now Pat. No. 8,532,920.

(60) Provisional application No. 61/297,435, filed on Jan. 22, 2010.

(51) Int. Cl.
*G01C 21/26* (2006.01)
*G01C 21/00* (2006.01)
(Continued)

(52) U.S. Cl.
CPC ............ *G01C 21/00* (2013.01); *G01C 21/3492* (2013.01); *G01C 21/3691* (2013.01);
(Continued)

(58) Field of Classification Search
CPC .................................................. G01C 21/3691
USPC ............... 701/412, 414, 465; 455/517, 422.1, 455/456.1
See application file for complete search history.

(56) References Cited

U.S. PATENT DOCUMENTS 8,259,652 B2 9/2012 Huang
2002/0161517 A1 10/2002 Yano et al.
(Continued)

FOREIGN PATENT DOCUMENTS

DE 102008005796 7/2009
EP 1237009 9/2002

OTHER PUBLICATIONS

Office Action mailed Nov. 7, 2013; in corresponding Canadian patent application No. 2,726,562.

(Continued)

*Primary Examiner* — Luke Huynh
(74) *Attorney, Agent, or Firm* — Thomas Grzesik; Fleit Gibbons Gutman Bongini & Bianco P.L.

(57) ABSTRACT

When a user enters, initializes, or otherwise starts using a navigation function, such as a navigation function on a mobile phone or a stand-alone device, a current location is automatically estimated, prior to or in the absence of a GPS fix, for use as an origin in route determination. The estimation of current location is performed using a database of GPS fixes that are mapped to cell tower identifiers. For example, the database can include one or more fixes associated with each cell tower that the mobile device has used. Thus, when navigation on the device is begun, one or more cell towers to which the device can communicate are identified. If any has a GPS fix in the database, then a location derived from such GPS fix(es) can be used as an origin for navigation functions. Such navigation functions can include estimating a time of arrival at a destination, producing a route to the destination, and checking for traffic updates.

20 Claims, 11 Drawing Sheets

(51) Int. Cl.
 *G01C 21/34*     (2006.01)
 *G01C 21/36*     (2006.01)
 *G01S 19/25*     (2010.01)
 *G01S 19/45*     (2010.01)
 *H04W 4/04*     (2009.01)
 *G08G 1/01*     (2006.01)
 *G08G 1/0968*     (2006.01)

(52) U.S. Cl.
 CPC ............... *G01S19/252* (2013.01); *G01S 19/45* (2013.01); *H04W 4/04* (2013.01); *G08G 1/0104* (2013.01); *G08G 1/096827* (2013.01); *G08G 1/096866* (2013.01)

(56) References Cited

U.S. PATENT DOCUMENTS

| | | |
|---|---|---|
| 2004/0104841 A1 | 6/2004 | Syrjarinne |
| 2008/0004791 A1* | 1/2008 | Sera ........................ 701/117 |
| 2008/0318594 A1 | 12/2008 | Monnerat |
| 2011/0034178 A1* | 2/2011 | Mehta ....................... 455/456.1 |

OTHER PUBLICATIONS

Notice of Allowance and Fee(s) Due mailed Mar. 15, 2013; in corresponding U.S. Appl. No. 12/962,874.

Extended European Search Report mailed May 25, 2011; in corresponding European patent application No. 10194172.2.

Office Action mailed Feb. 12, 2013; in corresponding Canadian patent application No. 2,726,562.

* cited by examiner

AUTOMATIC ORIGIN DETERMINATION FOR FASTER ROUTE REQUEST INITIATION AND RESULTING SYSTEM RESPONSE TIME

CROSS REFERENCE TO RELATED APPLICATIONS

This application is a continuation of U.S. patent application Ser. No. 13,962,772 filed Aug. 8, 2013, which is a continuation of U.S. patent application Ser. No. 12/962,874 filed Dec. 8, 2010, now U.S. Pat. No. 8,532,920, and claims the benefit of and priority to U.S. Provisional Patent Application No. 61/297,435, filed Jan. 22, 2010, the contents of each of the above patent applications are hereby expressly incorporated by reference in their entirety for all purposes herein.

BACKGROUND

1. Technical Field

The following relates generally to location based services (LBS) for mobile devices, and in particular to systems and methods for providing navigation information, such as routes, ETA information, search functionality, and other related functionality on mobile devices.

2. Related Art

Rush hour traffic volume, road construction, vehicular collisions, and roadside emergencies are just a few examples of the various events and circumstances that can cause traffic congestion. Due to the nature of such events traffic congestion can be difficult to predict. Although radio, television, and online news sources can provide traffic information gathered using various techniques such as highway cameras, phone-in traffic tips, satellite imagery, and road sensors; this information is stale and/or inaccurate.

Old or inaccurate traffic information can be troublesome for various reasons. For example, an alternate traffic route, which may be less convenient, is chosen due to a traffic report indicating that a traffic problem exists, which problem has since been alleviated. This can cause a commuter to take a less optimal route, which can waste fuel, cause them to be late, and cause congestion on side-roads. Conversely, a traffic report may indicate that the commuter's route is clear, when in fact an event has, in the meantime, created a traffic jam, since the traffic report is based on information that is not current.

Navigation systems typically rely on using Geographic Positioning System (GPS) fixes, in order to determine a present location, from which information such a route to a destination can be provided. However, determining a position based on received GPS signals takes time, and such time often depends on how many GPS satellite signals can be received, and the quality of such reception. Other approaches have included attempting to use triangulation based on reception of multiple cell tower identifiers and signal strength information for such cell towers. Although such approaches can produce an estimated position of the mobile device, they can be inaccurate, in that signal strength measurements can vary widely based on current topological and environmental conditions. Also, it may be more difficult in practice to obtain a number of identifiers for cell towers, in order to perform a triangulation. Using a single cell tower identifier may fail to provide sufficient accuracy, because a cell tower can serve a wide area, in some cases, such that simply connecting to that cell tower would be insufficiently precise for navigation purposes.

Therefore, advances in location determination and responsive of such location determination remain desirable, even though GPS location determination is used for the most part.

BRIEF DESCRIPTION OF THE DRAWINGS

Embodiments will now be described by way of example, and not limitation, with reference to the appended drawings wherein.

DETAILED DESCRIPTION

Figure 1:
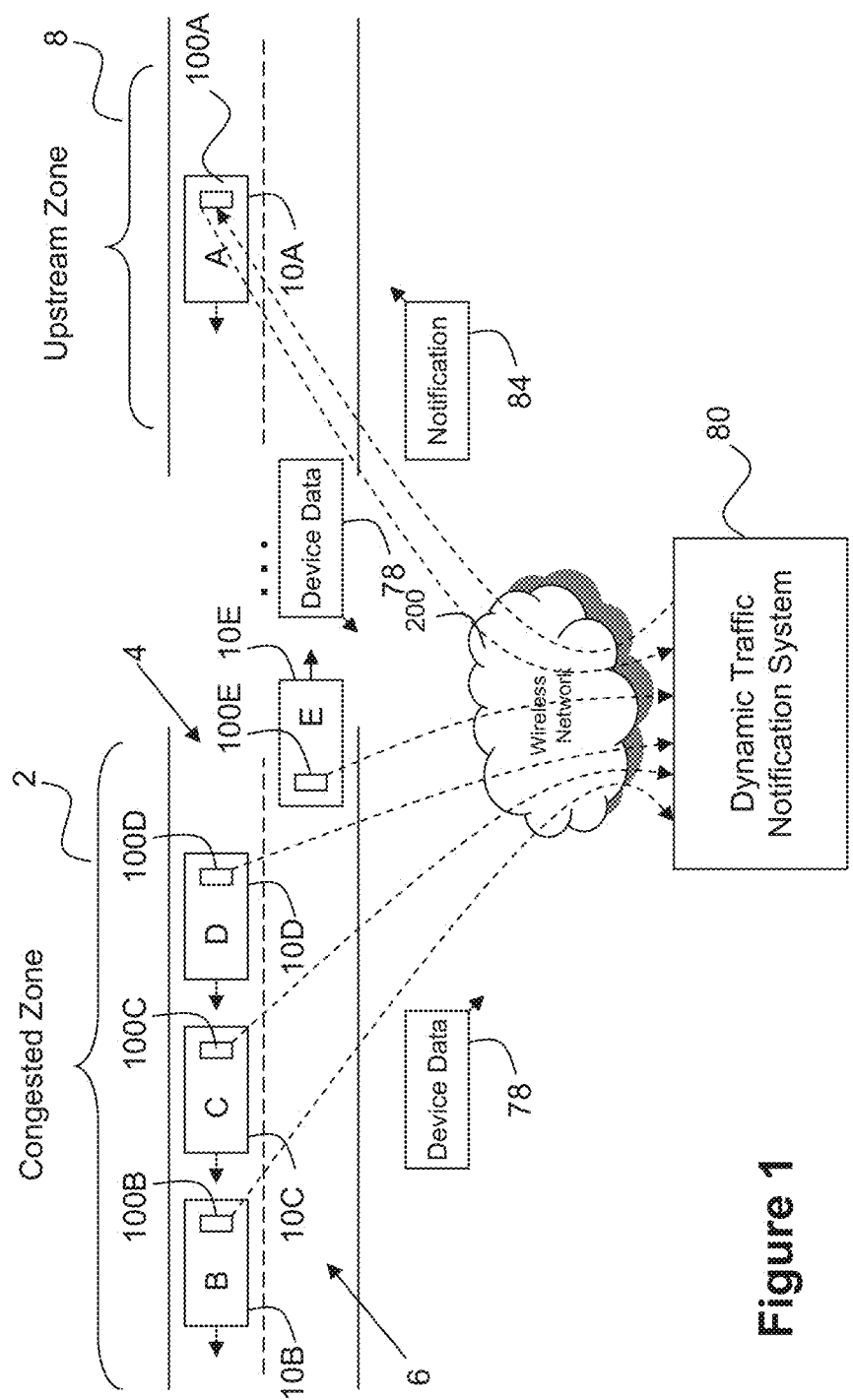
FIG. 1 depicts a schematic diagram illustrating an example of a traffic notification system providing a traffic notification to one mobile device according to data obtained from a plurality of other mobile devices.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Mobile devices often have GPS receivers (or more generically, a satellite positioning system signal receiver, such as GPS, GloNASS, etc.) for determining a current location of a device, which can be used in a variety of ways and applications, such as for navigation (GPS will be used generically for all such satellite navigation systems, for simplicity). Obtaining a GPS takes time, and sometimes a GPS fix is not available. For example, a person leaving work may leave a cubicle, and walk some distance before being exposed to strong enough signals from enough satellites to obtain a GPS fix. It is recognized herein, however, that a number of useful outputs relating to navigation can be provided in the absence of a precise GPS fix. In one example, if a user of a navigation application is leaving work, the user does not necessarily need precise information about how to navigate from an office location to a nearby freeway, since the user typically would be familiar with the vicinity. However, the user would be concerned with a larger context, such as how long a drive time may be required to get home, and whether any abnormal traffic conditions indicate that a detour or an alternate route should be taken. Such information can be often provided without a current GPS fix, if a general location is known. One approach to providing a general location is to determine identifying information for a cell phone tower that the mobile device current can communicate with. A correlation is maintained between such identifying information and prior GPS fixes for the mobile device. Such correlation can be maintained in a background process, for example, as a user simply uses the mobile device and/or the navigation application. The identifying information current obtained is used to determine whether a GPS fix is correlated with that cell phone tower. If so, then the prior GPS fix is used as an estimate of a current location of the mobile device until a current fix is available.

By particular example, when a user first begins using a navigation application (e.g., selects the application to begin execution through an interface on the mobile device), the identifying information for the cell phone tower would be available before the GPS fix (even assuming that a GPS fix can be obtained), and a GPS fix identified as associated with the cell phone tower can be used as a current position estimate. The current position estimate can in turn be used as an origin to a destination. Other information, such as traffic congestion information, can be requested sooner, as well. Navigation outputs, such as an estimated time of arrival and a recommended route can be provided based on the current position estimate. For normal user behaviour, the availability of such information is expected to be immediately useful, in order for a user to determine what to do, and where to go, comparatively more so than information such as turn-by-turn directions.

I. Route Representation: Technology for Representation of Routes can be Used in Navigation Supports Navigation Applications and Other Applications.

An object for vehicle navigation is providing a route from an origin to a destination. The route can be roughly defined to include an ordered sequence of roadways that may be traveled to move from the origin to the destination. In general, there will be many (perhaps millions of) possible sequences that may be used to travel between any given origin/destination pair. In practice, there are a relatively small number that are "good" (as defined by some measure or measures, such as shortest, fastest, and more subjective measures such as simplest, least stress, most scenic, and so on). Given a set of conditions, there often can be determined an optimal (best) route to fit a given measure or measures.

For computer-assisted vehicle navigation, a route can be defined relative to a map database. A map database generally comprises an object-based encoding of the geometry, connectivity and descriptive attributes of a collection of roadways, and is usually based on a topological model, such as a 1D directed graph inscribed within a 2D surface sheet. The individual objects in a model of this type include edges that mostly represent roads (such as the centerlines of roads), and nodes that represent locations where roads intersect and cul-de-sacs terminate. A "road" or "roadway" (used interchangeably here) in a map database can be defined in terms of a connected "chain" of edges that share a common name. Most roadways consist of a single connected chain. Some roads are more complicated, for instance, a road may be split in two by another geographic feature such as a river.

Certain non-road features can also be represented by edges, including railroads, streams and rivers, and the boundaries of area objects (faces) such as parks, water bodies, and military bases, as well as boundaries of towns, cities, counties and similar divisions of governmental hierarchy.

The geometry of the database can be represented by coordinate locations (x/y or longitude/latitude points) associated with nodes, and "shape" (often point sequences) associated with edges. The "raw" connectivity of the roadways is represented by the edge/node connectivity that is provided by the directed graph representation: each edge has a specific "from" and "to" node; each node has a list of edges that have the node at either the "from" or "to" end.

Actual road connectivity may be limited by descriptive attributes such as turn prohibitions and travel mode restrictions. Other descriptive attributes can include the road name, legal travel speed and direction (bi-directional or one-way), number of lanes and similar.

Map databases can carry different levels of detail. A fully-detailed, or large-scale map database will include everything from the most important long-distance highways to minor back alleys and un-paved country lanes. A sparsely detailed, or small-scale map database can have only the most important highways and connections that allow long distance travel.

Map databases also include varying geographical extents of coverage. Some map databases may cover only a small area. Others may cover entire continents. Often there is an inverse correlation between scale and coverage extent, in that large-scale maps tend to have limited geographic coverage, while continental extent maps may have limited detail. Such a circumstance was particularly true for paper maps (city map vs. road atlas), and is still true in paper-equivalent computer map renderings. A familiar example is the internet-based mapping service: when zooming in on a given displayed map area, more detail and less extent are displayed, and when zooming out, less detail and more extent are displayed.

In fully detailed databases, wide roads and roads with wide medians may also be split lengthwise into two separate one-way chains representing the two independent directions of travel. Many roads are short, consisting of only a single edge. Some roads are very long, spanning from ocean to ocean across a continent, and consisting of thousands of individual edges within a full-detailed representation. Most roads are somewhere between these two extremes.

A route as originally described may therefore be represented as a specific sequence of connected edges within a map database. Given a route with this representation, a variety of properties about the overall route can be determined by inspecting the individual edges. For instance, to determine the length of the route, one can sum the lengths of the individual edges. Similarly, to estimate travel time of a route, one can determine the travel time for each edge (length divided by speed) and accumulate the sum over the whole set. Such a travel time is termed "static", in that it would be based on a fixed representation of speed.

More elaborate results may be determined by examining a route's edge sequence within the context of the containing database. For instance, the list of turn-by-turn instructions that are required to follow a route may be inferred by examining how the route traverses each node relative to the other edges that occur at the corresponding intersection. Some intersection traversals are more important than others, and may warrant explicit identification in a route representation. Other intersections are more trivial; for example, those in which no turn is made. Such intersections may not be explicitly identified in some representations.

II. Traffic and Congestion Technology can be Used for Modeling of Traffic Patterns and Congestion, and can Build on Technology for Route Representation and Support Various Applications, Such Those Described Herein.

Turning now to FIG. 1, an example zone of traffic is shown, which comprises a traffic "problem" hereinafter named a congested zone 2. The congested zone 2 comprises a "left-bound" lane of traffic 4 (i.e. with respect to the page) and a "right-bound" lane of traffic 6. It can be seen that the congested zone 2 represents a common zone of traffic congestion caused by any one or more traffic events. Another zone of traffic is also shown in FIG. 1 and, in this example, represents an upstream zone 8, which refers to any roadway that is, approaching, expected to connect, lead into, or is simply an upstream portion of a same roadway that includes the congested zone 2. In this example, the upstream zone 8 thus feeds traffic into the congested zone 2 such that at least one mobile device 100 approaching the congested zone 2 can be determined.

In the example shown in FIG. 1, the congested zone 2 at a particular point in time comprises three vehicles travelling left-bound 4, namely vehicles 10B, 10C, and 10D; and comprises a single vehicle 10E travelling right-bound 6. For the present discussion, the congestion occurs in the left-bound lane only whereas vehicle 10E is moving at a normal rate of speed in the right-bound lane. The upstream zone 8, at the same point in time, comprises a single vehicle 10A travelling left-bound 4 towards the congested zone 2. Each vehicle 10A-10E comprises a respective data communications device, hereinafter referred to as a mobile device 100A-100E, which travels with the corresponding vehicle 10A-10E in which it currently resides. As will be explained below, the mobile device 100 can be any suitable device capable of communicating via a wireless network 200. The mobile devices 100 utilize such capability to provide device data 78 to a dynamic traffic notification sub-system 80, via the wireless network 200. The device data 78 comprises information related to the location and speed of the vehicle 10, as measured by, or obtained by or from another source, the mobile device 10 located and travelling within the vehicle 10. For example, mobile device 100B in vehicle 10B may utilize a GPS function to measure the speed of the vehicle 10B and the current location, prepare device data 78, and send the device data 78 to the dynamic traffic notification sub-system 80, hereinafter referred to as "the notification sub-system 80" for brevity.

As will also be explained below, the notification sub-system 80 uses device data 78 from a plurality of mobile devices 100 to dynamically determine traffic conditions, such as the development of the congested zone 2, in order to prepare a notification 84 that can be sent to a mobile device 100 that is expected to be headed towards the congested zone 2.

III. Building and Using a Traffic Congestion Model.

Commute traffic congestion tends to follow very reliable patterns. For example, a given stretch of heavily used freeway at 7:30 AM every weekday morning, would be expected to have traffic moving much slower than during normal "free-flow" conditions. Within that basic model, more refined patterns can be found. For example, it can be found that traffic may be heaviest on Monday (33 mph average), a little lighter Tuesday-Thursday (37 mph) and perhaps lighter still on Friday (45 mph). However, the same stretch of freeway may be free flowing (e.g., 65 mph) at noon, flowing well during the evening commute (e.g., 60 mph), and racing along at 75+ mph overnight and on the weekend.

Further, observations for a single person traveling at the roughly the same time over the same route for five days a week, 50 weeks a year, can be accumulated to develop a robust model of the traffic congestion that this person faces each day, including its consistency, its day-of-the-week and season-of-the-year variability, and perhaps most importantly, the congestion's effect on the travel time that the person experiences daily.

Furthermore, these observations can yield information about how the congestion tends to affect certain portions of the route. For example, a portion of a route following "Hwy 1" tends to flow at 39 mph, and the portion that follows "Hwy 2" tends to flow at 51 mph. In turn, the portion of Hwy 1 between $7^{th}$ and $10^{th}$ streets can be observed to average 34 mph at around 7:44 AM, and the portion between $10^{th}$ and $14^{th}$ streets observed to average 41 mph at 7:51 AM and so on.

This description of a single person's experience can be generalized into the system concept of collecting traffic data using "traffic probe" and using that data for traffic modeling. By collecting observations or data for a large enough number of vehicles/drivers (by, for example, using wireless devices with GPS), then those observations and that data can be aggregated and collectively analyzed to develop an overall model of traffic congestion. In such a system, each device (e.g., owned by a driver of a vehicle) serves as a probe sensing the traffic conditions at particular locations and times. The overall picture serves as the traffic model, and is a byproduct of the system.

(a) Real Time Traffic Data.

Previously, it was disclosed that data collection for and observations about personal driving habits can be used to improve accuracy of the estimation of route travel time and correspondingly ETA determination, and further that historical traffic models have the potential for even greater improvement and wider application.

However, both of these methods rely on the stability of previously observed driving patterns, and some times actual traffic congestion (due to accidents, bad weather, sporting events and similar, or just wide variability) is much worse (and occasionally much better) than expected.

If the departure time for a trip is immediate, it typically is preferable to know what the "live, real time" traffic conditions are now, rather than relying solely on the historical model, at least for the first portion of the route. Such an approach should yield more accurate travel time and ETA, and can serve as a trigger to alert the driver that today's experience will be worse ("you're going to be late") or better ("you have ten extra minutes") than usual.

With a network of probes (which can be used to produce the historical traffic model described previously), it is possible to monitor the current activity of all probes in real time to produce a current picture of traffic congestion, as will be addressed further below. For example for all traffic segments, a list of recent probe samples for each segment can be tracked and used to compute a "live expected speed" for the segment.

An approach to using these live speeds to compute travel time can be similar to the use of speeds from the historical model and can include stepping through the route's edges in sequence computing travel times for each edge. If the edge corresponds to a traffic segment for which there is a current live speed then that speed can be used. If this is no live speed, then the historical model value from the appropriate time slot can be used. If there is no traffic segment, then a static speed can be used.

In practice, a robust implementation is more complicated than this conceptual description. One reason is that live traffic has a limited "shelf life". In other words, after some amount of time (e.g., 30 minutes), it is likely that the current live speed will be invalid, and that the historical pattern speed may be more accurate.

A preferred speed determination function includes a continuous function of live and historical values. A simplified description of one such function can be: for a set time along the route (<10 minutes) the average live speed of recent probes is used, then for some period of time (10-30 minutes) a decreasing fraction of live combined with an increasing fraction of historical speed is used, after which historical is used exclusively.

Because conditions will change, the ETA calculation preferably is continuously updated as the route is consumed (traveled) during driving. Such preference is based on at least three reasons. First, actual traffic congestion will continue to evolve, and probes driving somewhere up ahead may detect different and new conditions, thus evolving the live model. Second, because part of the route has been consumed by driving, the location framework for live traffic has shifted, so that live information is needed for roads that are further along the route than originally needed. Third, because actual travel progress may vary greatly from the original estimate (particularly on long routes), the time framework of the historical model may also change, resulting in a dramatic increase or decrease of likely traffic speeds far ahead.

Live traffic and congestion data, such as that obtained from in-vehicle probes, can be used for modelling traffic and congestion, and can supplement a historical model. A mixture of live data and historical data can be used.

(b) Estimating Required Time of Departure.

In addition to giving ETA estimates, understanding travel times a second application that relates to ETA. This application can be phrased as "What is my Required Time of Departure (a.k.a ETD)?" In other words, if I know that I need to get somewhere at time T, when do I need to leave in order to be confident that I will make it? An example method to determine includes: perform a "static" travel time summation ($tt_{static}$); assume the departure time is T-$tt_{static}$ and calculate the $ETA_1$; if $ETA_1$>T, then back up the departure time by the difference ($ETA_1$-T) and try again. Repeat until $ETA_i$<=T. Error factors may be used "pad" the travel time estimation in order to reduce the chance of being late in case the traffic happens to a little worse (but not unusually worse) than usual.

IV. Example Architectures

To aid the reader in understanding at least one environment in which the notification sub-system 80, and the above-described applications, may be implemented, an example system comprising the wireless network 200 and other components that may be used to effect communications between mobile devices 100 and the notification sub-system 80 will now be described.

As noted above, data communication devices will be commonly referred to as "mobile devices." Examples of applicable mobile devices include pagers, cellular phones, cellular smart-phones, portable gaming and entertainment devices, wireless organizers, personal digital assistants, computers, laptops, handheld wireless communication devices, wirelessly enabled notebook computers and the like.

One exemplary mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a smartphone, a data messaging device, a two-way pager, a cellular telephone with data messaging capabilities, a wireless Internet appliance, or a data communication device (with or without telephony capabilities).

The mobile device may be one that is used in a system that is configured for continuously routing content, such as pushed content, from a host system to the mobile device. An example architecture of such a system will now be described.

(a) Example System Architecture.

Figure 2:
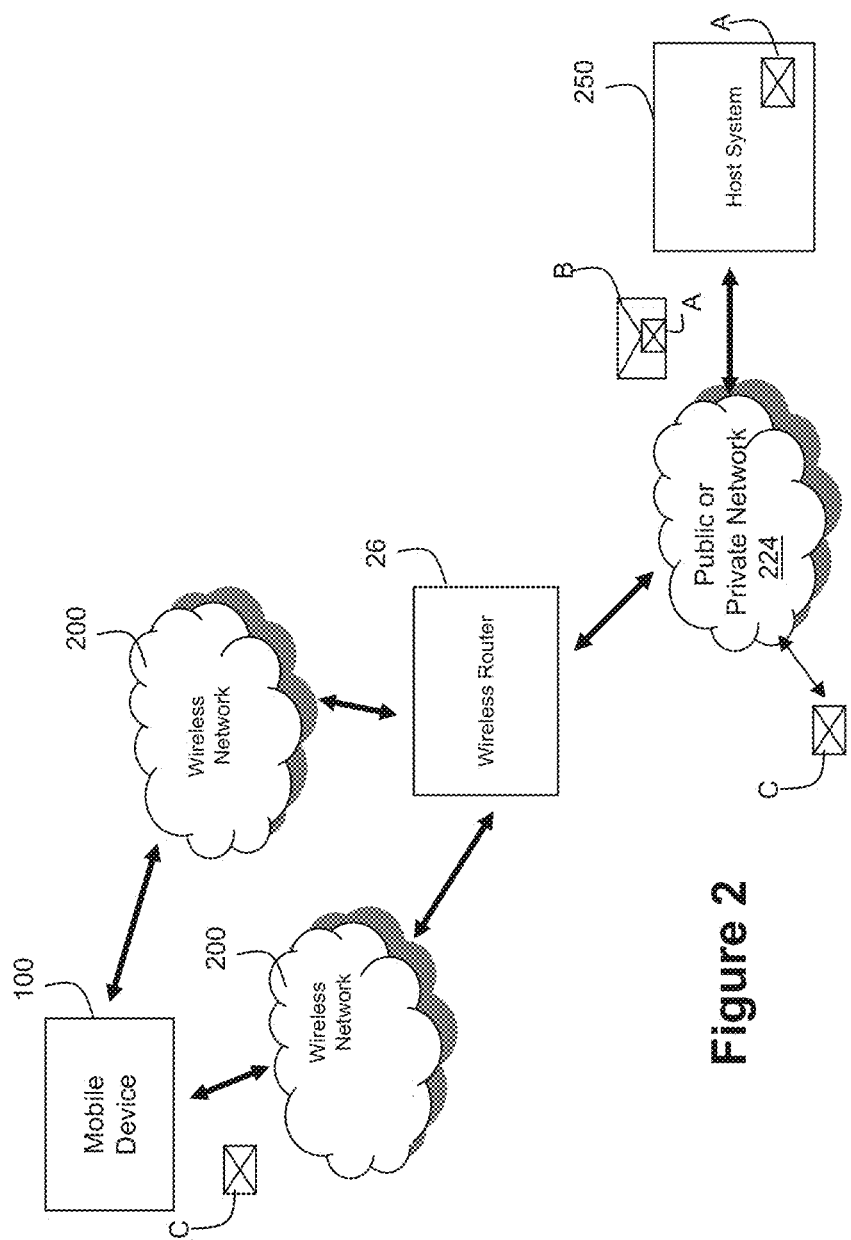
FIG. 2 depicts a system diagram illustrating the environment in which data items are pushed from a host system to a mobile device.

Referring now to FIG. 2, an example system diagram showing the redirection of user data items (such as message A or C) from a corporate enterprise computer system (host system) 250 to the user's mobile device 100 via a wireless router 26 is provided. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 2 represents an internal message sent from, e.g. a desktop computer within the host system 250, to any number of server computers in the corporate network (e.g. LAN), which may, in general, include a database server, a calendar server, an E-mail server or a voice-mail server.

Message C in FIG. 2 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of datastores (for example a data store for e-mail can be an off-the-shelf mail server program such as Microsoft Exchange® Server or Lotus Notes® Server), which typically are behind a corporate firewall.

The mobile device 100 may be adapted for communication within wireless network 200 via wireless links, as required by each wireless network 200 being used. As an illustrative example of the operation for a wireless router 26 shown in FIG. 2, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through a firewall protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

(i) Message Router/Relay Server.

Provision of a wireless router 26 (sometimes referred to as a "relay"), there are a number of advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 5) might be receiving and processing e-mail while an associated program (e.g. an e-mail wireless mobility agent) is also monitoring the mailbox for the user and forwarding or pushing the same e-mail to a wireless device 100. A host service might also be modified to prepare and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless paging computer as exemplified in FIGS. 3-8, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection, e.g. a portable gaming device. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunneling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others.

This wireless network 200 abstraction can be accomplished by wireless router 26, which can implement this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

Providing push services for host systems 250 can be bettered by the wireless router 26 implementing a set of defined functions. The wireless router 26 can be realized by many hardware configurations; however, features described likely would be present in these different realizations.

Figure 4:
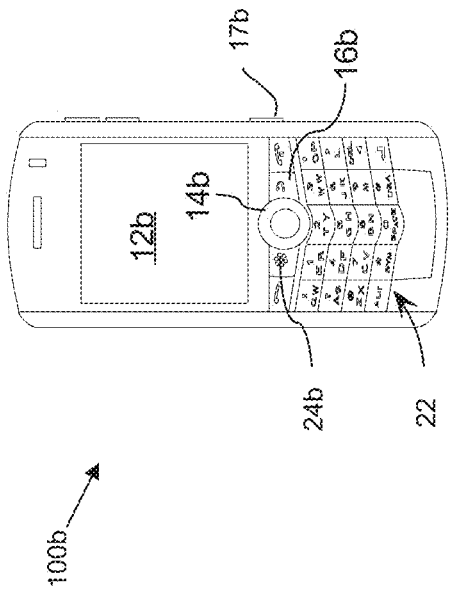
FIG. 4 depicts a schematic diagram of another mobile device and a display screen therefor.
Figure 3:
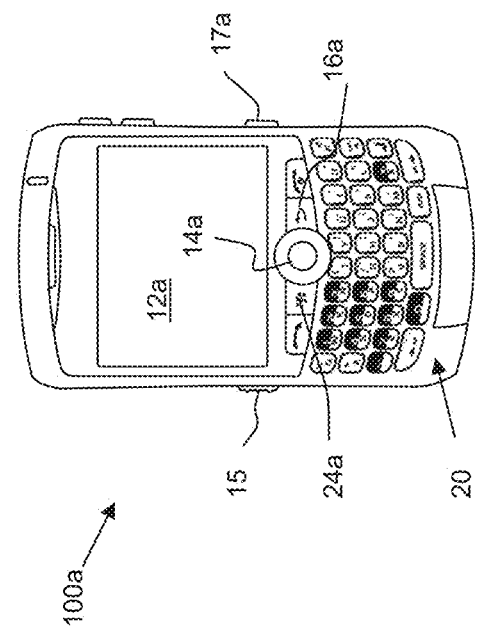
FIG. 3 depicts a schematic diagram of a mobile device and a display screen therefor.

Referring to FIGS. 3 and 4, one example of a mobile device 100a is shown in FIG. 3, and another example of a mobile device 100b is shown in FIG. 4. More generally, the numeral "100" will hereinafter refer to any mobile device 100, and by explanation and reference, the examples 100a and 100b of FIGS. 3 and 4. A similar numbering convention is used for some other general features common between FIGS. 3 and 4 such as a display 12, a positioning device 14, a cancel or escape button 16, a camera button 17, and a menu or option button 24.

The mobile device 100a shown in FIG. 3 comprises a display 12a and the cursor or view positioning device 14 shown in this embodiment is a trackball 14a. Positioning device 14 may serve as another input member and is both rotational to provide selection inputs to the main processor 102 (see FIG. 5) and can also be pressed in a direction generally toward housing to provide another selection input to the processor 102. Trackball 14a permits multi-directional positioning of the selection cursor 18 (see FIG. 7) such that the selection cursor 18 can be moved in an upward direction, in a downward direction and, if desired and/or permitted, in any diagonal direction. The trackball 14a is in this example situated on the front face of a housing for mobile device 100a as shown in FIG. 3 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 3 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 4 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 4, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

The mobile device 100 may employ a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other input device, whether presently known or unknown. Similarly, any variation of keyboard 20, 22 may be used. It will also be appreciated that the mobile devices 100 shown in FIGS. 3 and 4 are for illustrative purposes only and various other mobile devices 100 are equally applicable to the following examples. For example, other mobile devices 100 may include the trackball 14b, escape button 16b and menu or option button 24 similar to that shown in FIG. 4 only with a full or standard keyboard of any type. Other buttons may also be disposed on the mobile device housing such as color coded "Answer" and "Ignore" buttons to be used in telephonic communications. In another example, the display 12 may itself be touch sensitive thus itself providing an input mechanism in addition to display capabilities. Furthermore, the housing for the mobile device 100 should not be limited to the single-piece configurations shown in FIGS. 3 and 4, other configurations such as clamshell or "flip-phone" configurations are also applicable.

Now, to aid the reader in understanding the structure of the mobile device 100 and how it can communicate with the wireless network 200, reference will now be made to FIGS. 5 through 8.

(ii) Example Mobile Device Architecture.

Figure 5:
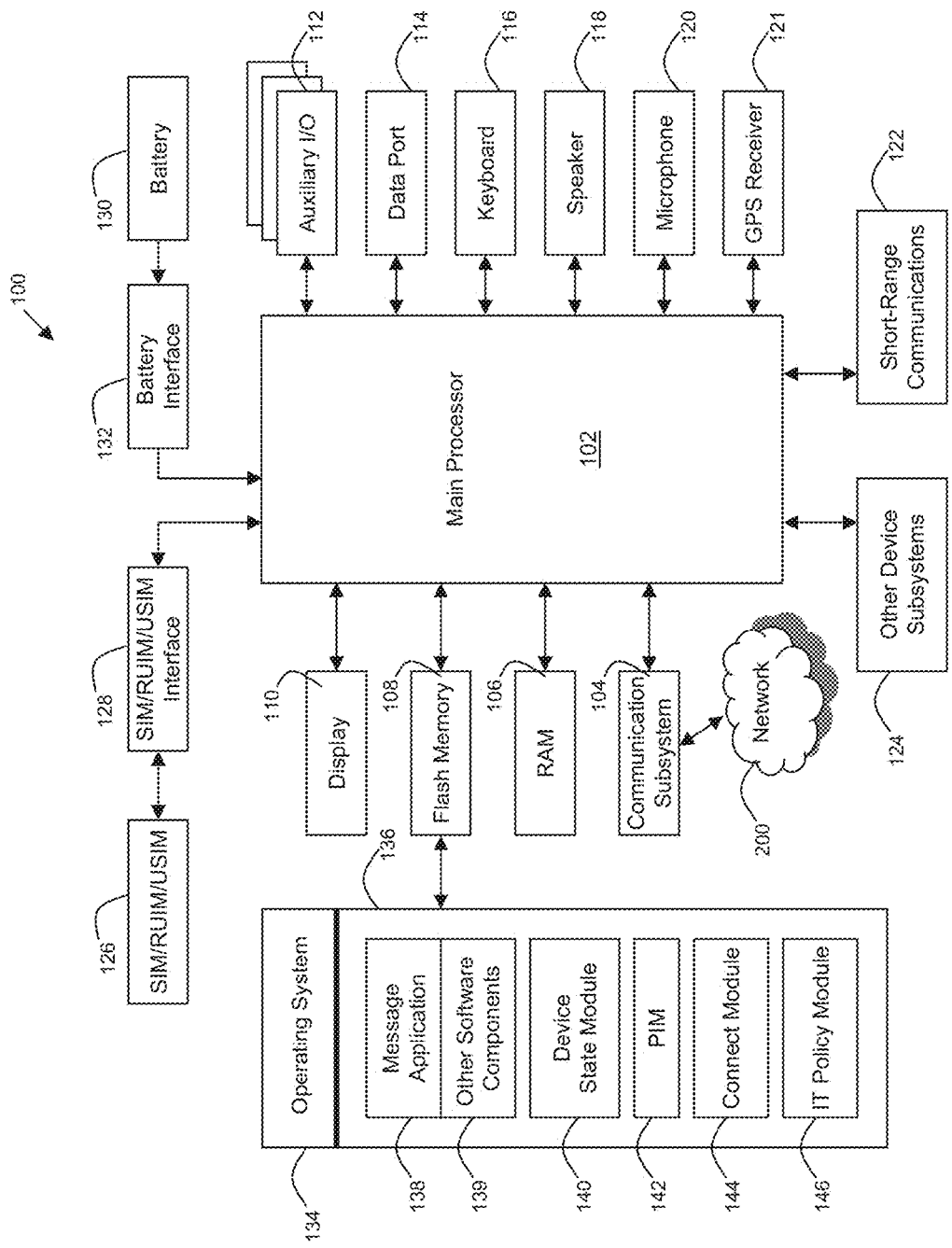
FIG. 5 depicts a block diagram of an exemplary embodiment of a mobile device.

Referring first to FIG. 5, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the aspects disclosed herein can be used with and adapted for other suitable communication protocols and standards that may be developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100. In some embodiments, a plurality of batteries, such as a primary and a secondary battery may be provided.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

(A) Mobile Device Software & Firmware

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 can provide persistence, i.e. the device state module 140 provides for availability and storage of potentially important device data. Device state module 140 can be implemented using flash memory 108 (or other non-volatile memory technologies), so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 can receive IT policy data that encodes IT policies, and may be responsible for organizing and securing rules, such as a "Set Maximum Password Attempts" IT policy, and password expiration policies.

Other types of software applications or components 139 can also be installed on the mobile device 100. These software applications 139 can be pre-installed applications (e.g., applications other than message application 138) or third party applications, which are added after the manufacture of the mobile device 100. Examples of third party applications include games, calculators, and utilities.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

(B) Wireless Communication Sub-System

Figure 6:
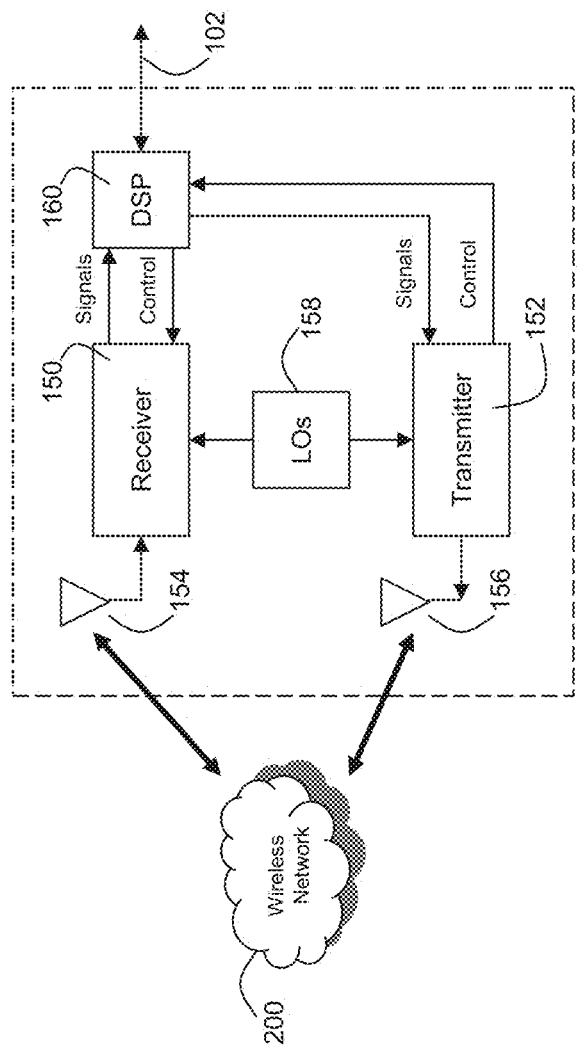
FIG. 6 depicts a block diagram of an exemplary embodiment of a communication subsystem component of the mobile device of FIG. 5.

Referring now to FIG. 6, an exemplary block diagram of the communication subsystem component 104 is shown. The communication subsystem 104 includes a receiver 150, a transmitter 152, and example associated components such as one or more embedded or internal antenna elements 154 and 156, Local Oscillators (LOs) 158, and a processing module such as a Digital Signal Processor (DSP) 160. The particular design of the communication subsystem 104 can be dependent on the communication network 200 with which the mobile device 100 is intended to operate. Thus, it should be understood that the design illustrated in FIG. 6 serves only as one example. Radios also can be implemented differently, for example, LOs can be avoided by avoiding intermediate frequencies, such as by using direct digital sampling.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that should be conserved, based on concerns such as limits of overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods. The receiver 150 also can be turned on to poll for data to be retrieved.

Some aspects of the description provided relate to a system architecture where information can be pushed to mobile devices. Such system architectures can operate to push information responsive to a request from a mobile. For example, mobile device 100 can request information periodically, and the system can respond with any messages or notifications determined to be applicable to device 100.

(C) Example User Interface

Figure 7:
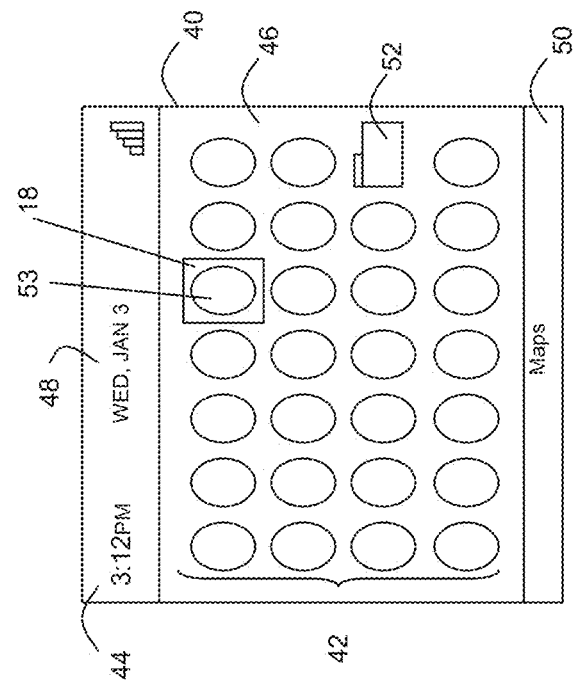
FIG. 7 depicts a screen shot of an exemplary home screen displayed by a mobile device.

Turning now to FIG. 7, the mobile device 100 may display a home screen 40, which may be the active screen when the mobile device 100 is powered up or may be accessible from other screens. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 7 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 can provide information to the user based on the location of the selection cursor 18, e.g. by displaying a name for the icon 53 that is currently highlighted.

An application, such as a maps program 60 (see also FIG. 8) may be initiated (opened or viewed) from display 12 by highlighting a corresponding icon 53 using the positioning device 14 and providing a suitable user input to the mobile device 100. For example, maps program 60 may be initiated by moving the positioning device 14 such that the icon 53 is highlighted by the selection box 18 as shown in FIG. 7, and providing a selection input, e.g. by pressing the trackball 14*b*.

Figure 8:
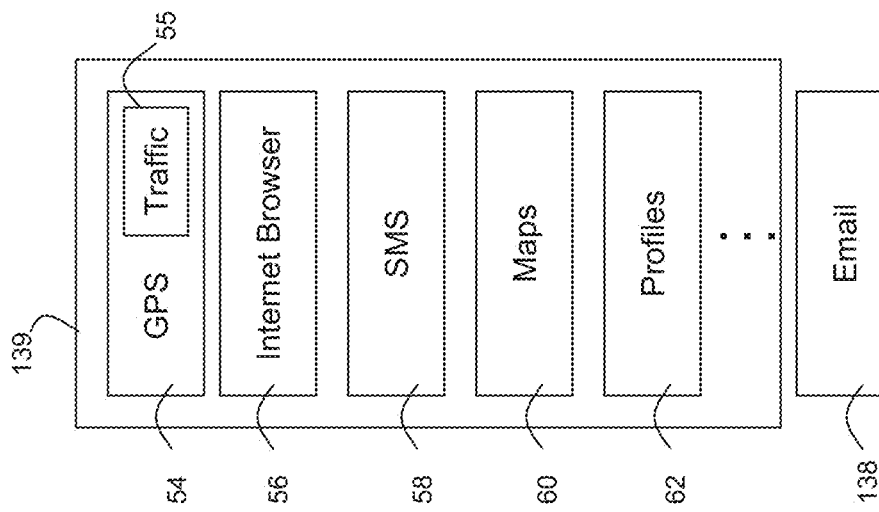
FIG. 8 depicts a block diagram illustrating exemplary ones of the other software applications and components shown in FIG. 5.

FIG. 8 shows an example of how other software applications and components 139 that may be stored on and used with the mobile device 100 can use the user interface. Only examples are shown in FIG. 8 and such examples are not to be considered exhaustive. In this example, a global positioning system (GPS) application 54, internet browser 56, simple message service (SMS) 58, maps program 60 and a profiles application 62 are shown to illustrate the various features that may be provided by the mobile device 100. The GPS application 54, in this example, comprises a traffic module 55, which represents any sub-program, sub-routine, function or other set of computer executable instructions for providing device data 78 to the notification sub-system 80, when such data 78 is obtained using the GPS application 54. Also shown in FIG. 8 is the message application 138, which in the following will be referred to as an email application 138 for clarity. It will be appreciated that the various applications may operate independently or may utilize features of other applications. For example, the GPS application 54 may use the maps program 60 for displaying directions to a user.

V. An Example Approach to User Interfaces for Sending Notifications of ETA Via Messaging Technologies The above description is related to automatically predicting a destination for automatic provision of an ETA and related information. Such ETA can be shared according to the disclosure relating to the method of FIG. 9, and at least one of the user interfaces depicted in FIG. 11 and FIG. 12.

Figure 9:
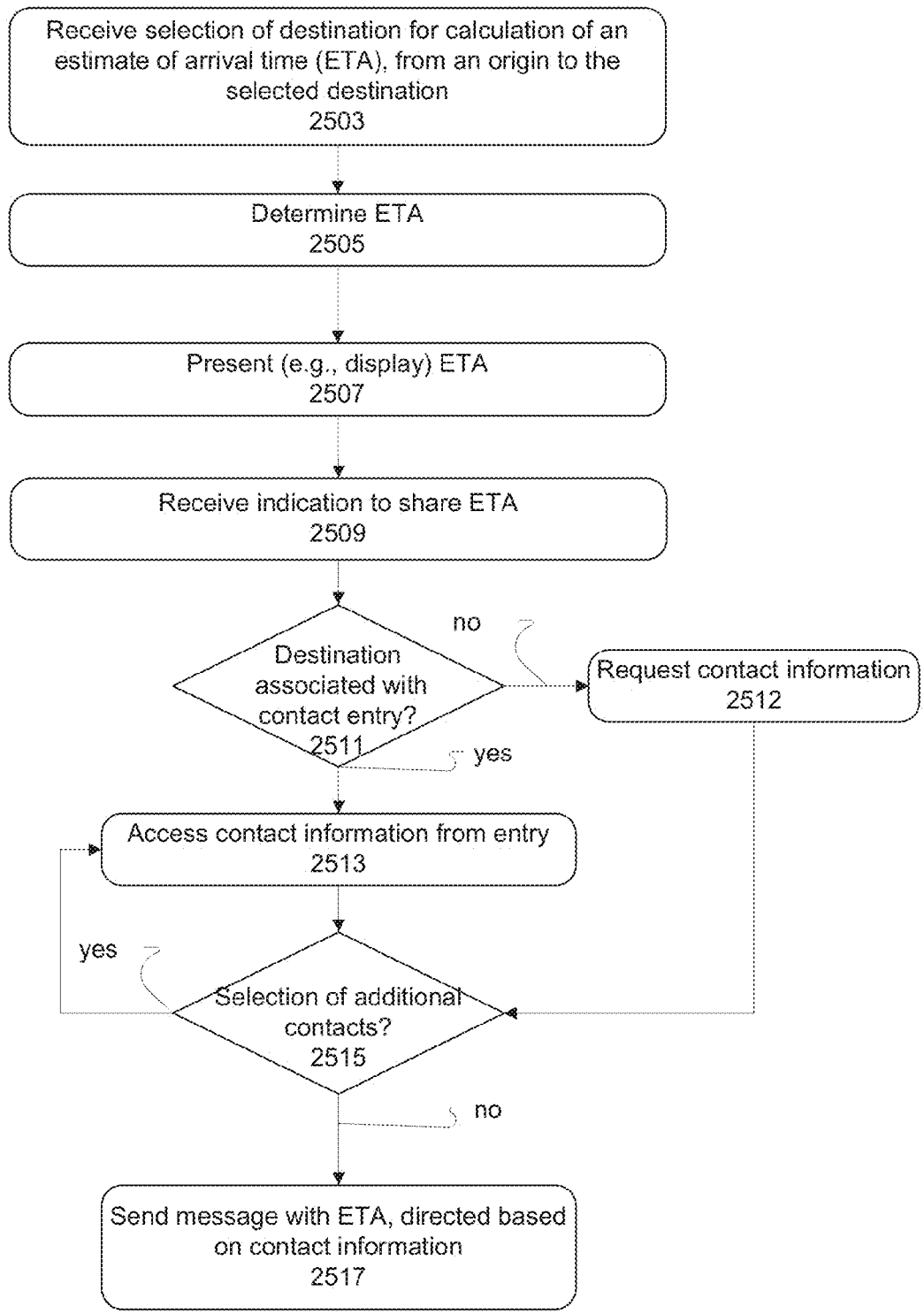
FIG. 9 depicts a method for sending ETA information to contacts.

Turning first to FIG. 9, its method is described below. A selection of destination, and calculation and display of ETA can be conducted (2503, 2505, 2507), either by selection of places, or by automatic selection, as described above. An indication to share the ETA can be received (2509). A determination (2511) of whether the destination is associated with an entry in a contact manager is made. If there is such an associated entry, then contact information from that entry is obtained (2513), and if not then contact information can be requested (2512) through the user interface. An option to select additional contacts can be provided (2515), which can cause acceptance of additional contacts. Upon determining contact information to which the ETA should be sent, messages can be sent (2517), directed to each contact informational element. For example, a Short Message Service message can be generated to be sent to phone numbers associated with the contact entry, and/or phone numbers supplied by a user through the interface.

Figure 11:
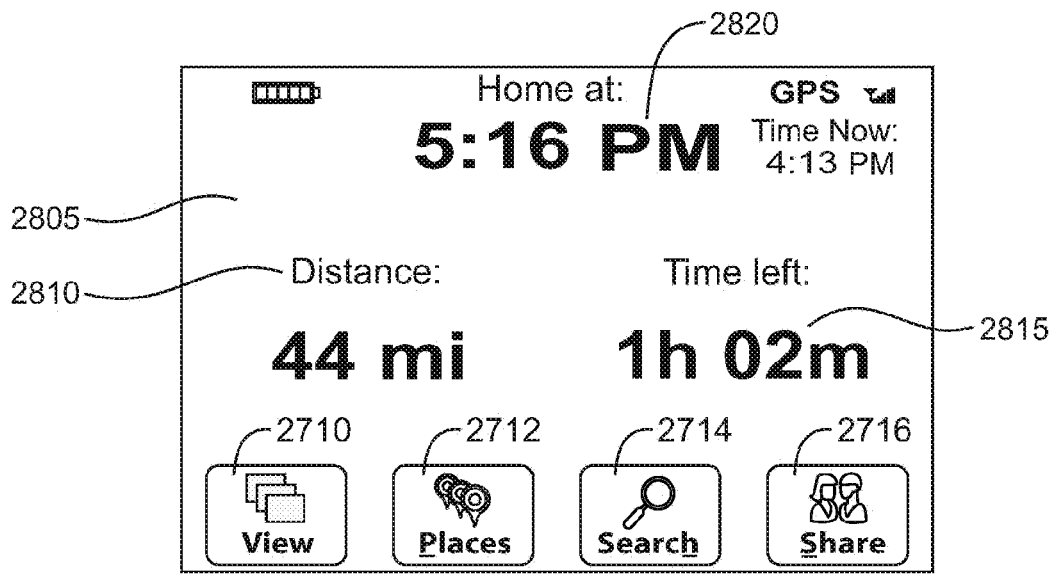
FIG. 11 depicts an example display of ETA information.
Figure 12:
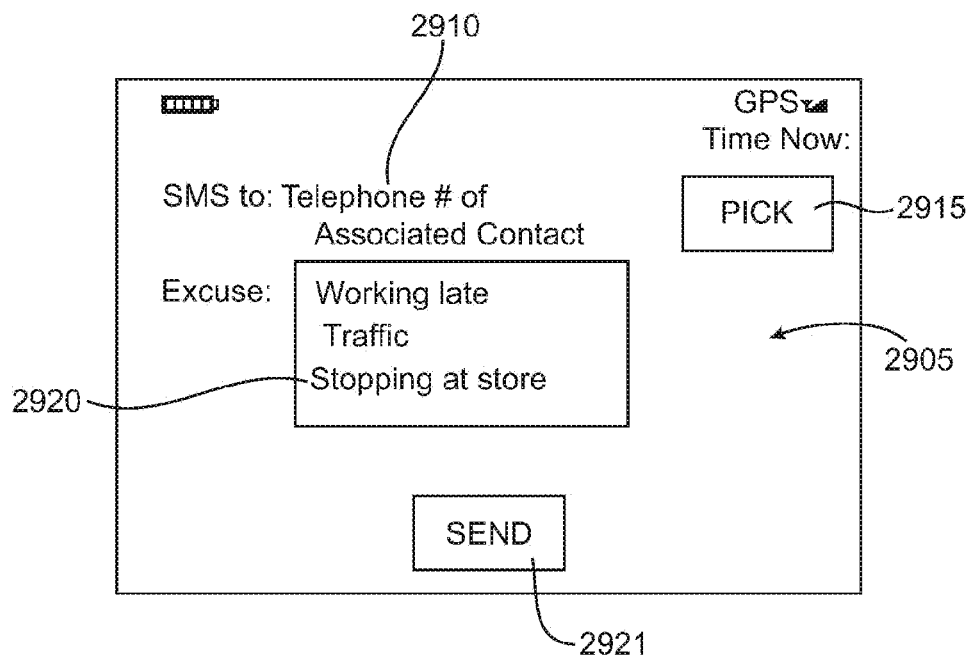
FIG. 12 depicts an example user interface element that can be provided with the method of FIG. 10.
Figure 13:
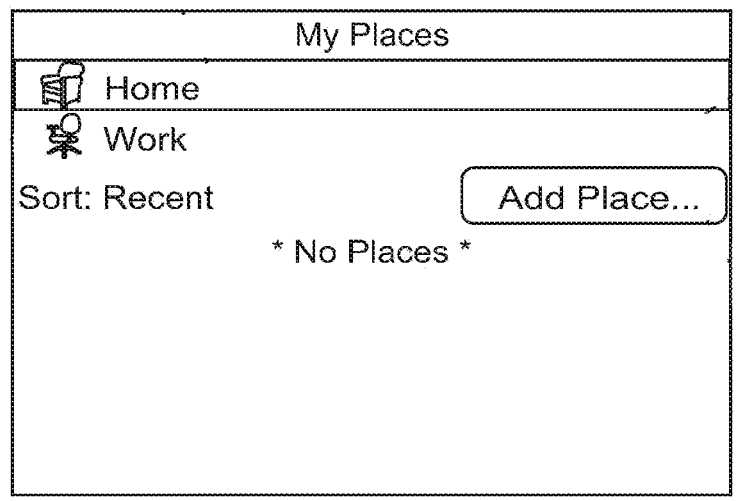
FIG. 13 depicts a user interface element within the navigation application.

The user interface element 2805 of FIG. 11 depicts an estimated time of arrival (ETA) 2820, the distance to travel 2810 and travel time left 2815. The user interface element 2905 of FIG. 12 depicts that a default operating procedure can be that an SMS message is sent to a phone number associated with the contact (2910), while a Pick 2915 button allows the option to select additional phone numbers. An excuse window 2920 can be provided, which allows a reason to be included in the message as to why the ETA may be different from what was expected. A send button 2921 allows confirmation of the selections before the messages with the ETA information are sent.

Such aspects can include automatic production/sending of supplemental/periodic update notifications based on a variety of conditions or parameters, including elapsed time, proximity to POI, departures from the route, or re-selections. For example, updates can be made hourly, or when passing a given point. The user interface can be modified or a user interface provided that provides user-selectable options, which can have defaults for such parameters and conditions.

VI. An Example Approach to User Interfaces and Techniques for Presenting Traffic and Route Information in a User-Friendly Format.

Figure 14:
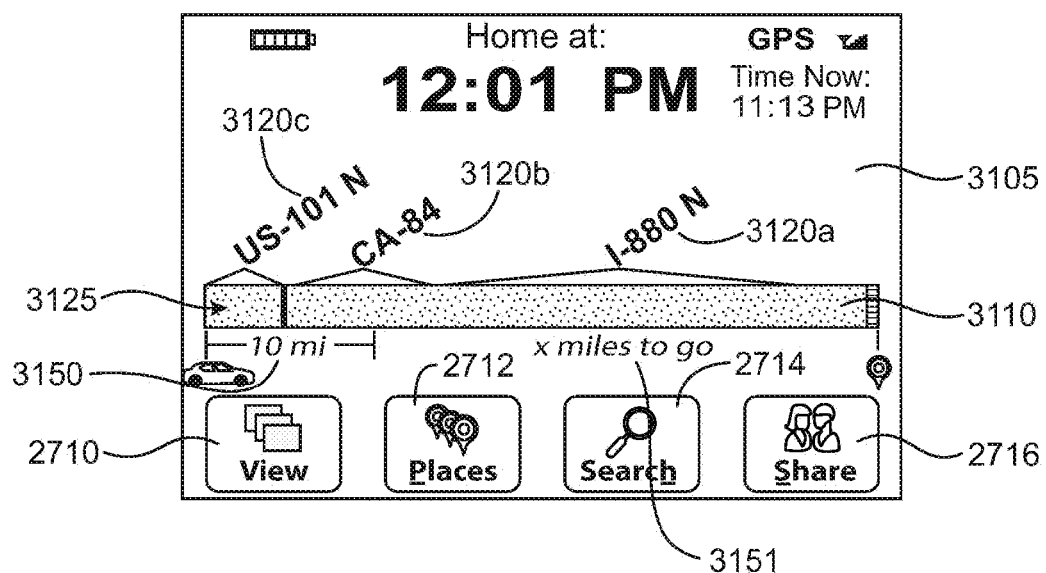
FIG. 14 depicts a first example user interface element relating to route representation.

As shown in FIG. 14, routes, which can comprise a number of interconnected road (travel) segments are depicted (on user interface element 3105) as linear representations (also can be called a spine or a trunk), such as linear shape 3110 (which in that it represents a route, also can be termed a linear representation of such route). Such linear representation can be oriented along one axis of a 2-D display of the device, such as along an axis that is parallel to a field of view of a user of the device (and thus can vary if the device is turned on its side, such that the route orientation can turn to maintain that orientation with respect to the viewpoint of the user). Preferably, the linear representation takes up most of the available display width. Indicators of information such as roads to be taken along the route can be represented at angles along the linear representation (e.g., indicators 3120*a*, 3120*b*, and 3120*c*). Indication of traffic congestion information (3125) can be represented by different cross hatching or colors within the area of the linear representation 3110, itself. The user interface element 3105 can also depict the miles traveled 3150 and the miles to be traveled 3151.

To the extent that these indicators apply to one or more portions of the route (as opposed to a point on the route), these indicators also can be viewed as information segments. For example indication 3125 of traffic congestion can be termed an information segment for the portion of the route on which that congestion occurs, and which is indicated by indication 3125. As can be discerned, an information indicator thus can be an indicator of a point along a route to which an informational item is relevant, as well as a segment of a route along which such informational item is relevant. As will become apparent, such informational indicators can be overlayed on the linear representation (linear shape) of the route, as is 3125, above or below such linear representation.

VII. Automatic Origin Estimation for Navigation Outputs.

In addition to the aspects disclosed above, aspects herein include estimating or predicting an origin for use in generating a navigation output, such as a recommended route.

In these aspects, a given mobile device (as disclosed in various examples above), tracks which cellular towers it communicates with (such as generally receiving identifiers for cell towers that are available in a given area, or more specifically, towers that are used for data and voice communication), as the mobile device is used or simply carried about or otherwise transported, such as in a car or on foot. Such tracking can include tracking identifiers of such cell towers. For each such distinct cell tower identifier, a GPS fix of the mobile device when the mobile device is receiving the identifier for that cell tower (or in some more specific examples, using or otherwise resident on) that cell tower is obtained and recorded in a database. In these aspects, the GPS fix is not a location or attempted to be the location of the cell tower itself, but a location of the device when the device uses that cell tower.

In some aspects, the location recorded for each of the cell towers is selected based on knowledge of user/device behaviour. For example, if the mobile device is traveling a route to a destination, and upon arriving at the destination, the mobile device is using a given cell tower, an identifier for that cell tower can be associated with a GPS fix obtained for the destination. In a more concrete example, a mobile device can be used on a route between a user's home and a workplace. Upon arriving at the workplace, a cell tower identifier can be obtained, and a GPS fix of the workplace can also be obtained. Such an approach is in contrast with approaches that attempt to make contact with multiple cell towers, and use signal strength indications from those cell towers in approximating a current location of the device.

By way of further explanation, a plurality of mobile devices can be communicating with the same cell tower. However, each can be located in a different physical location, for which a respective GPS fix is obtained. Then, each mobile device can use its respective GPS fix for that same cell tower (when the mobile device is resident on it) as an origin for navigation. Thus, these aspects are not attempting to estimate locations of the cell towers themselves. Rather, each mobile device independently determines which locations are important to that device, for each cell tower, and then can use those pre-determined locations as likely origins when resident on each cell tower.

Figure 15:
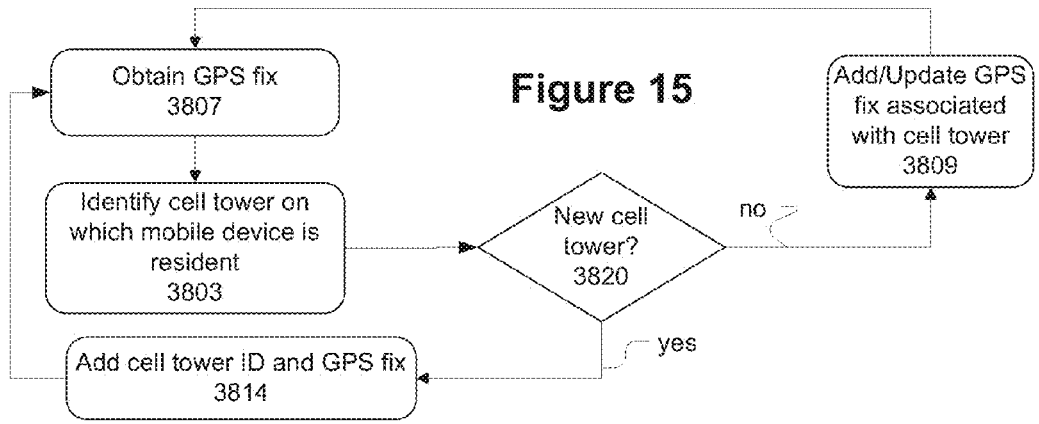
FIG. 15 depicts an example method for maintaining and/or producing a list of cell tower identifiers with which the mobile device has communicated, and a GPS fix for the mobile device during such communication.

FIG. 15 depicts an example method aspect according to the above-description. FIG. 15 depicts that a background process running on a mobile device, which include obtaining/receiving GPS fixes (3807) as they are available (e.g., from a GPS receiver, as disclosed above—See FIG. 5). The mobile device identifies a cell tower on which the mobile device is resident (3803), or more generally, from which it has received an identifier. For example, at any given time, the mobile device may be receiving indicators of a number of cell tower identifiers presently within range of the mobile device. Each identifier is unique to a cell tower, and each cell tower may belong to or be operated by one or more network operators, including operators of networks not usable by the mobile device, itself. Thus, even if the mobile device may not actually be using a given cell tower for data or voice communications, the mobile device nevertheless may have received one or more identifiers for that cell tower, and can associate a GPS fix with that identifier, as it is received.

In other situations, the only cell tower identifier that may be available to an application is an identifier for a cell tower which the device currently would use for communication (whether or not the mobile device currently is communicating with that cell tower).

In any of the above examples, the method can monitor whether a given cell tower identifier (whether it is one or more than one identifier at any given time) is new, and perform the method aspects disclosed below for each such identifier.

If the cell tower (identifier) is new (determination 3820) (which in some cases can indicate that a change has been made since a last cell tower identifier was received), such determination can be made based on whether the cell tower has an identifier already stored on the mobile device. If the identifier does not exist (i.e., the device has not encountered this tower before, or it has expired from a cache), then the GPS fix obtained is/stored (3814) with the identifier received.

If the identifier exists, then the device can perform a variety of actions, or no action. The depicted method represents that the GPS fix now being received can be added to a list of GPS fixes associated with the cell tower, or used to replace one or more GPS fixes already associated with the cell tower (3809). In either case, a further GPS fix can be obtained (3807) in due course. If the identifier for the cell tower is unchanged, then the GPS fix associated with the still-current cell tower can be updated (3809) based on the obtained GPS fix (in a case where multiple cell tower identifiers are currently available or visible, then if desired, a GPS fix for each such identifier can be updated). Thus, the method depicted in FIG. 15 generally provides for the last GPS fix while any given cell tower identifier is available is saved for that cell tower such that initially, it can be assumed that the mobile device is proximate that last GPS fix, before a real GPS fix has been obtained.

In other embodiments, a weighted average of the GPS fixes can be maintained, or a simple average, or several fixes can be maintained for each identifier. For example, in some embodiments, multiple GPS fixes may be maintained to be associated with each cell tower identifier, and in other embodiments, a blended average of GPS fixes may be provided. For example, a blended GPS fix may be produced for multiple cell towers when concurrently receiving identifiers for such multiple cell towers. By further example, a time-weighted average of locations identified while a given cell tower identifier is received can be provided. For example, if the device stops moving for a period of time while communicating with a given cell tower identifier, and then starts moving again, the location where the device was stopped can be weighted more heavily in a location (generic for a GPS fix, in that the exact location or GPS fix that would be associated with the cell tower identifier in this scenario may never have been actually determined as a location of the device) associated with that cell tower identifier. Further, information about road and point of interest information can be used in determining a location associated with a given cell tower identifier. Still further, pre-defined places (see e.g., FIG. 30 and description relating thereto) can be consulted to determine whether a GPS fix obtained while communicating with a given cell tower identifier is proximate any such pre-defined place. If there is a pre-defined place close to the current GPS fix, then that pre-defined place may be used as a current location of the mobile device when receiving that cell tower identifier.

In some embodiments, a cell tower identifier may be made provided from an application programming interface to an application implementing these disclosed method aspects. Similarly, a GPS fix may be made available through an application programming interface to a GPS function. As such, the application can query each interface to obtain a current one or more cell tower identifiers currently being received, and a current GPS. The application can schedule such queries, such as on a regular interval. The GPS interface can be queried responsive to detecting a change in the cell tower identifier(s) being received.

Figure 10:
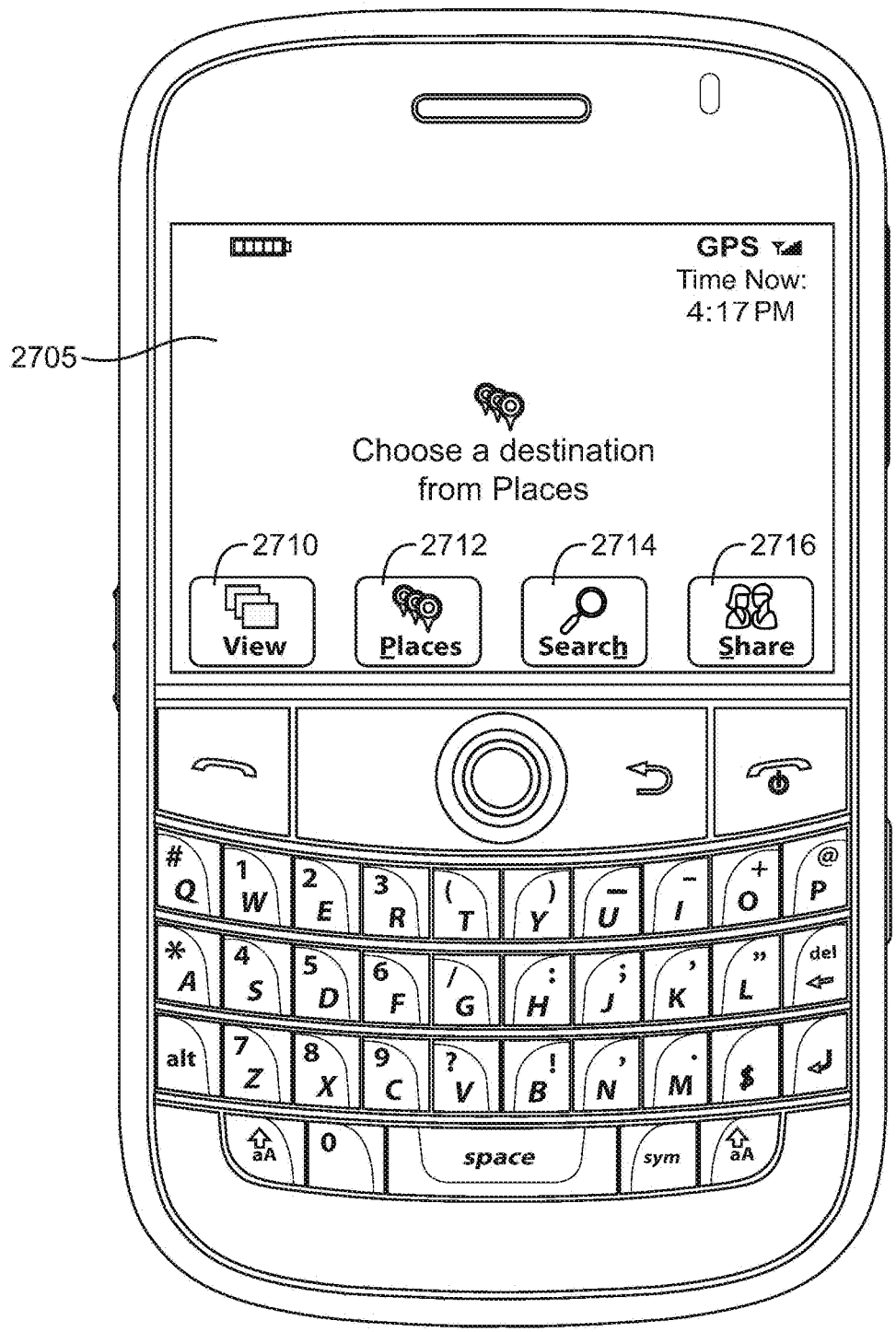
FIG. 10 depicts an example start screen of a navigation function that can provide functionality and use technology described above.
Figure 16:
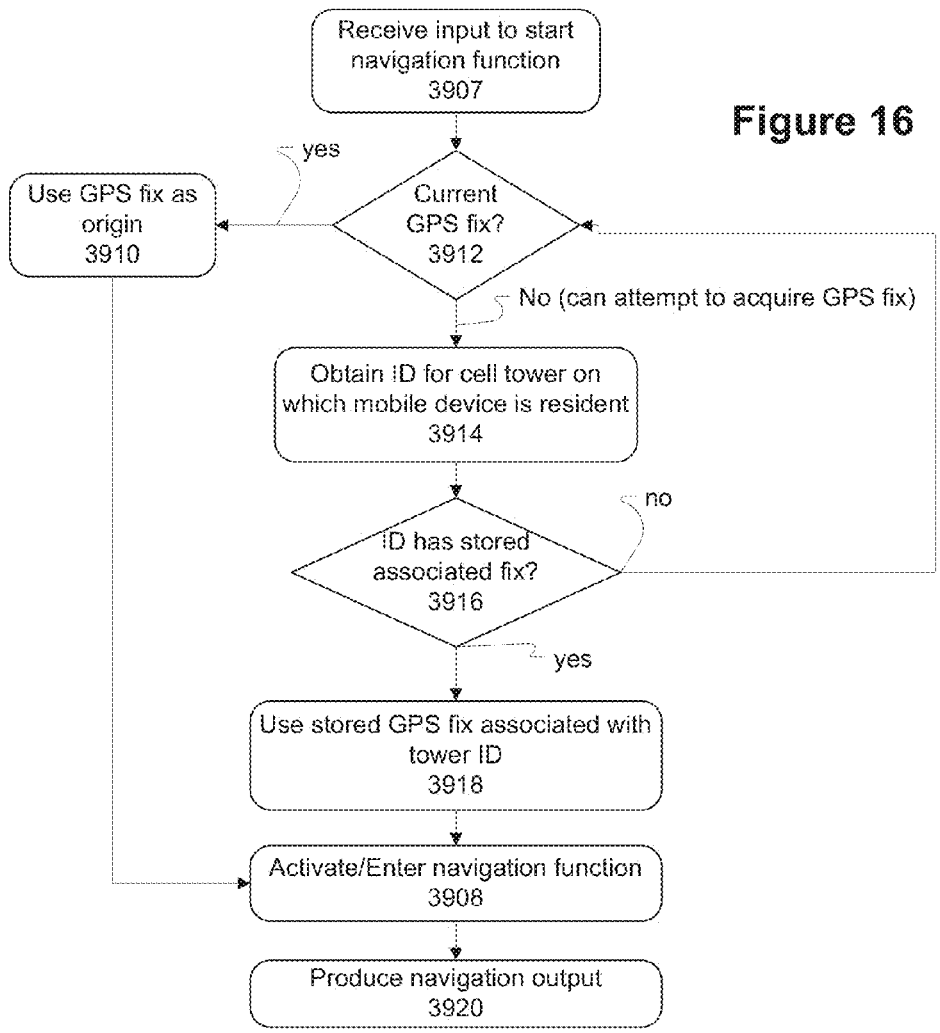
FIG. 16 depicts an example method of accessing such a list to obtain a location to be used as a location of the mobile device, prior to or in the absence of a current GPS fix.

FIG. 16 depicts that for the purposes of navigation, input to start a navigation function can be received (3907) (e.g., through an interface 2705 according to the example of FIG. 10, such as indicating selection of a place 2712 to which to navigate). The navigation function can be started in response to a places icon 2712 being selected. The places icon 2712 can be selected from among a plurality of icons, e.g., a view icon 2710, a search icon 2714, and a share icon 2716. In another example, a device can have a home screen, such as in FIG. 7, where a number of icons (e.g., icons 42) can be provided, one of which can be an icon for a navigation function. Selection of such icon can represent input (3907) and result in display of the interface depicted in FIG. 10. In some examples, the method aspects of FIG. 16 described below can be initiated after selection from the home screen, even as the FIG. 10 interface is being prepared for display.

A determination as to whether there is a current GPS fix can be made (3912), which can include that a GPS receiver can be turned on to begin a process of obtaining such a fix (which would imply an absent of a GPS fix at that instant). If there is a current GPS fix, then it can be used (3910) as an origin for producing (3920) a navigation output after entering/activating the navigation function (3908).

If there isn't, then one or more cell tower identifiers currently available (being received) by the mobile device (such as by virtue of being resident on that cell tower, or simply being able to receive an identifier for it) is obtained (3914) (note that although this statement is phrased as a conditional, the actual reception of such tower identifiers by the device as a whole can be a by-product of using the wireless network, and as such, the reception of such identifiers isn't conditional on the absence of a GPS fix, but rather, the method makes use of the tower identifiers to access historical GPS fix information, as described below, when current GPS fix information is not available.

The identifier available is looked up (3916) in the data stored on the computer readable medium that associates such IDs with GPS fixes, and if there is an association between that cell tower identifier and a GPS fix, that associated GPS fix is used (3918) as an origin for producing or requesting a navigation output (3920), after entering or activating (3908) the navigation function. Such navigation outputs can include a route determination, an estimated arrival time, traffic congestion conditions, and the like. If the tower ID is not found, then the method can loop determine whether a current GPS fix is available (3912).

In some exemplary embodiments, the cellular tower IDs and their associated GPS fixes are stored in a computer readable medium on the mobile device, such as in one or more of flash 108 and RAM 106 of example device 100 in FIG. 5. In example embodiments, a pre-determined maximum number of cell tower identifier entries can be stored in the computer readable medium, such as 1000, more than 1000, or less 1000 identifiers. As discussed above, one or more GPS fixes are stored for each identifier, or a location reflecting an average or a synthesis of multiple GPS fixes.

The various examples described above are provided by way of illustration only and should not be construed as limiting. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. Disclosure of memories and other examples of computer readable medium provide for tangible computer readable media that store information as specified. Processors can be implemented in a variety of ways, including processors that are fully programmable with software, and combinations of fixed function and software-programmable processing elements. Different implementations may call for a different mixture of processing elements, and selection therefrom for a particular implementation can be performed by those of ordinary skill in the art.

Although the above has been described with reference to certain specific embodiments, various modifications thereof will be apparent to those skilled in the art as outlined in the appended claims. Also, disclosure of certain techniques or examples with respect to a subset of the disclosures or examples herein does not imply that such techniques or examples pertain only to those disclosures, but rather such selective disclosures are made for the sake of clarity, to avoid obscuring principal teachings of the disclosure.

The invention claimed is:

1. A mobile device, comprising:
a processor; and
a memory coupled to the processor and storing instructions for configuring the processor to perform a method comprising:
in response to a current geographical positioning system (GPS) fix based on received satellite positioning signals being unavailable;
obtaining, from a non-transitory computer readable medium, a position associated with identifying information for a wireless network transceiver element communicatively coupled with the mobile device; and
using the obtained position as a current position of the mobile device for producing a navigation output from the mobile device.

2. The mobile device of claim 1, wherein the position associated with the identifying information is a previously obtained GPS fix of the mobile device based on received satellite positioning signals when the mobile device was receiving the identifying information.

3. The mobile device of claim 1, wherein the method further comprises updating positions stored on the non-transitory computer readable medium with GPS fixes determined while communicating with each wireless network transceiver element.

4. The mobile device of claim 1, wherein the method further comprises producing the navigation output while attempting to obtain the current fix based on received satellite positioning signals.

5. The mobile device of claim 1, wherein the navigation output comprises at least one of:
an estimated arrival time at a destination;
traffic congestion information; and
a route to a selected destination, using the current position as an origin.

6. A method for implementation on a mobile device, comprising:
in response to a current geographical positioning system (GPS) fix based on received satellite positioning signals being unavailable;
obtaining, from a non-transitory computer readable medium, a position associated with identifying information for a wireless network transceiver element communicatively coupled with the mobile device; and
using the obtained position as a current position of the mobile device for producing a navigation output from the mobile device.

7. The method of claim 6, wherein the position associated with the identifying information is a previously obtained GPS fix of the mobile device based on received satellite positioning signals when the mobile device was receiving the identifying information.

8. The method of claim 6, further comprising updating positions stored on the non-transitory computer readable medium with GPS fixes determined while communicating with each wireless network transceiver element.

9. The method of claim 6, wherein the position is a GPS fix associated with the identifying information on the non-transitory computer readable medium.

10. The method of claim 6, further comprising caching GPS fixes associated with identifying information for wireless transceiver elements received by the mobile device during operation of the navigation application.

11. The method of claim 8, further comprising storing of identifiers of wireless network transceiver elements by updating on the non-transitory computer readable medium, on an interval, a corresponding GPS fix for each wireless network transceiver element while the identifier for that wireless network transceiver element continues to be received by the mobile device.

12. The method of claim 11, wherein the storing further comprises saving the last GPS fix for each wireless transceiver element identifier received by the mobile device.

13. The method of claim 11, wherein the storing further comprises saving a plurality of GPS fixes for each wireless transceiver element identifier received by the mobile device.

14. The method of claim 11, wherein the navigation output comprises:
   an estimated arrival time at a destination;
   traffic congestion information; and
   a route to a selected destination, using the current position as an origin.

15. The method of claim 14, wherein the destination is automatically selected based on a predefined association between the origin and another location.

16. A non-transitory computer readable medium storing computer executable instructions for programming a processor to perform a method on a mobile device, comprising:
   in response to a current geographical positioning system (GPS) fix based on received satellite positioning signals being unavailable;
      obtaining, from a non-transitory computer readable medium, a position associated with identifying information for a wireless network transceiver element communicatively coupled with the mobile device; and
      using the obtained position as a current position of the mobile device for producing a navigation output from the mobile device.

17. The non-transitory computer readable medium of claim 16, further storing a plurality of identifiers of wireless infrastructure components associated with respective GPS fixes obtained by the navigation application while the mobile device was communicating with those wireless infrastructure components.

18. The non-transitory computer readable medium of claim 16, wherein the navigation output comprises:
   an estimated arrival time at a destination;
   traffic congestion information; and
   a route to a selected destination, using the current position as an origin.

19. The non-transitory computer readable medium of claim 18, wherein the navigation output comprises a route which was selected based on the origin, a destination, and traffic congestion information.

20. The non-transitory computer readable medium of claim 16, wherein the destination is automatically selected based on a pre-defined association between the origin and another location.

* * * * *